(12) United States Patent
Knierim

(10) Patent No.: US 10,796,209 B2
(45) Date of Patent: Oct. 6, 2020

(54) INK JET PRINT HEAD WITH STANDARD COMPUTER INTERFACE

(71) Applicant: XEROX CORPORATION, Norwalk, CT (US)

(72) Inventor: David L. Knierim, Wilsonville, OR (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/018,414

(22) Filed: Jun. 26, 2018

(65) Prior Publication Data

US 2019/0392271 A1 Dec. 26, 2019

(51) Int. Cl.
*B41J 2/08* (2006.01)
*G06K 15/10* (2006.01)
*B41J 2/045* (2006.01)
*B41J 3/54* (2006.01)

(52) U.S. Cl.
CPC ........ *G06K 15/102* (2013.01); *B41J 2/04573* (2013.01); *B41J 2/04586* (2013.01); *B41J 2/04588* (2013.01); *B41J 3/543* (2013.01); *B41J 2202/13* (2013.01); *B41J 2202/17* (2013.01)

(58) Field of Classification Search
CPC . G06K 15/102; B41J 2/04573; B41J 2/04586; B41J 2202/13
USPC .................. 358/1.15, 1.4, 1.8, 502; 347/211
See application file for complete search history.

(56) References Cited

U.S. PATENT DOCUMENTS

| 5,376,953 A * | 12/1994 | Voelker ...................... B41J 2/35 347/211 |
| 5,526,128 A * | 6/1996 | Fujiki ..................... G06K 15/00 345/634 |
| 5,677,647 A | 10/1997 | Knierim |
| 6,076,922 A | 6/2000 | Knierim |
| 2002/0021315 A1* | 2/2002 | Sato ....................... B41J 2/0451 347/9 |
| 2006/0164447 A1* | 7/2006 | Poole ..................... B41J 29/393 347/5 |
| 2006/0284915 A1 | 12/2006 | Han |
| 2007/0242094 A1* | 10/2007 | Silverbrook ......... G06K 15/102 347/13 |
| 2012/0229533 A1* | 9/2012 | Kanzawa ............. B41J 2/04548 347/1 |
| 2014/0022556 A1* | 1/2014 | Bruno ................... B41J 19/205 356/614 |

(Continued)

FOREIGN PATENT DOCUMENTS

JP 09300604 A 11/1997
WO 2004049466 A2 6/2004

*Primary Examiner* — Jamares Q Washington
(74) *Attorney, Agent, or Firm* — Miller Nash Graham & Dunn LLP

(57) ABSTRACT

A print head, has a standardized computer interface to allow the print head to connect directly to a standard computer, an array of jets to deposit ink on a substrate in accordance with image data from the standard computer, a processing element to receive image data through the standardized computer interface, a buffer to store the image data received through the standardized computer interface and to transmit the image data to the array of jets when triggered by a dot clock, the buffer under control of the processing element and having a flexible depth of storage, and a driver to trigger individual ones of the array of jets in accordance with the image data.

10 Claims, 3 Drawing Sheets

(56) References Cited

U.S. PATENT DOCUMENTS

2014/0268388 A1   9/2014  Shuta et al.
2016/0318314 A1* 11/2016  Veis ......................... B41J 11/06
2016/0368265 A1* 12/2016  Dipert .................. B41J 2/04541

* cited by examiner

INK JET PRINT HEAD WITH STANDARD COMPUTER INTERFACE

TECHNICAL FIELD

This disclosure relates to print heads, more particularly to print heads and the control electronics for print heads.

BACKGROUND

Ink jet printers generally rely upon a source of image data, such as a computer of some kind, that sends the image data to a print controller within a print system. The print controller typically resides in the print system, or printer, external to the print head. The print controller then sends control signals based upon the image data to a print head. The print head contains manifolds and other ink routing structures, and the drop generators and their respective actuators.

The print controller typically generates or receives a clock, sometimes referred to as a 'dot clock,' to trigger drop ejection by the print head. The print controller may receive the image data from the computer as data words for each drop generator, each word controlling a number of sequential drop ejections for its associated drop generator. The print controller then generates a voltage waveform set for the drop generators immediately following each dot clock, sending these waveforms to the print head. The waveform set may include both analog voltages and control lines defining the voltage polarity and timing. Each dot clock also triggers the controller to send data to the print head to define which jets will be selected for the next waveform set following the next dot clock. Both the waveform set and data are sent to the print head precisely timed with drop ejection, triggered by the dot clock.

Typically, each printer has its own control electronics architecture designed to provide the necessary waveforms, control lines, and data to the print head. However, it is possible to eliminate the print controller as external to the print head and to simplify and streamline print systems.

SUMMARY

An embodiment includes a print head that has a standardized computer interface to allow the print head to connect directly to a standard computer, an array of jets to deposit ink on a substrate in accordance with image data from the standard computer, a processing element to receive image data through the standardized computer interface, a buffer to store the image data received through the standardized computer interface and to transmit the image data to the array of jets when triggered by a dot clock, the buffer under control of the processing element and having a flexible depth of storage, and a driver to trigger individual ones of the array of jets in accordance with the image data.

DETAILED DESCRIPTION OF THE EMBODIMENTS

Figure 1:
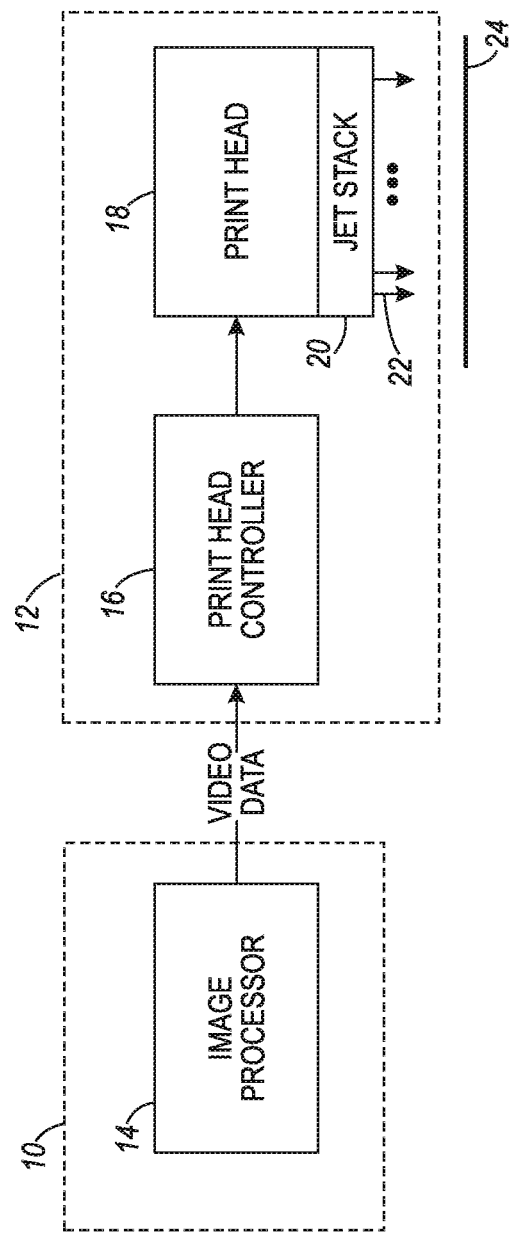
FIG. 1 shows a prior art embodiment of a print system.

Currently available printing systems require external control electronics. Typically, the control electronics resides within the printer but outside the print head. As shown in FIG. 1, a computer system 10 is connected wired or wirelessly to a print system 12. The computer system has an image processor 14, which may be a dedicated image processor, or a general-purpose processor including the computer system's central processing unit.

The computer 10 passes the image data to a print head controller 16 in the print system 12. The print head controller 16 interfaces with the computer 10 and the print head 18. The print head 18 then controls the jet stack 20. A jet stack typically consists of a set of plates that stack together to form a series of channels and chambers for routing ink to an array of ink jets or nozzles 22 that can then drop ink on the print substrate 24.

Figure 2:
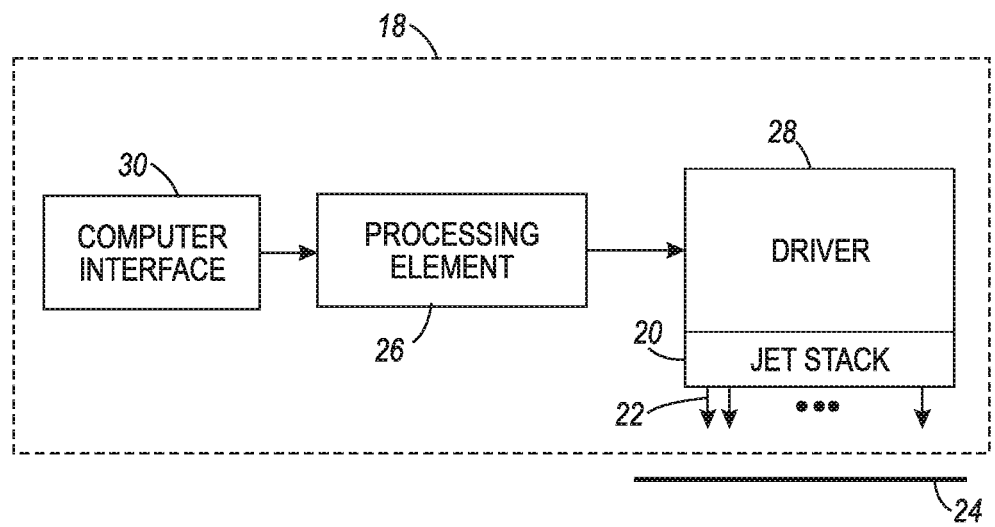
FIG. 2 shows an embodiment of a standalone print head.

In the embodiments disclosed here, there is no separated print controller. Instead, the print head 18 has all the electronics internally within it as shown in FIG. 2. These may include a processing element 26, a driver 28 that drives the jet stack 20 and its individual jets 22.

The print head 18 receives the image data through a standardized computer interface 30 such as a Universal Serial Bus (USB). As will be discussed in more detail, this may consist of a USB Type C that would allow the embodiments to extend to full frequency applications. For higher-frequency applications on normal USB2 connections, external DC power may be applied to the print head.

Figure 3:
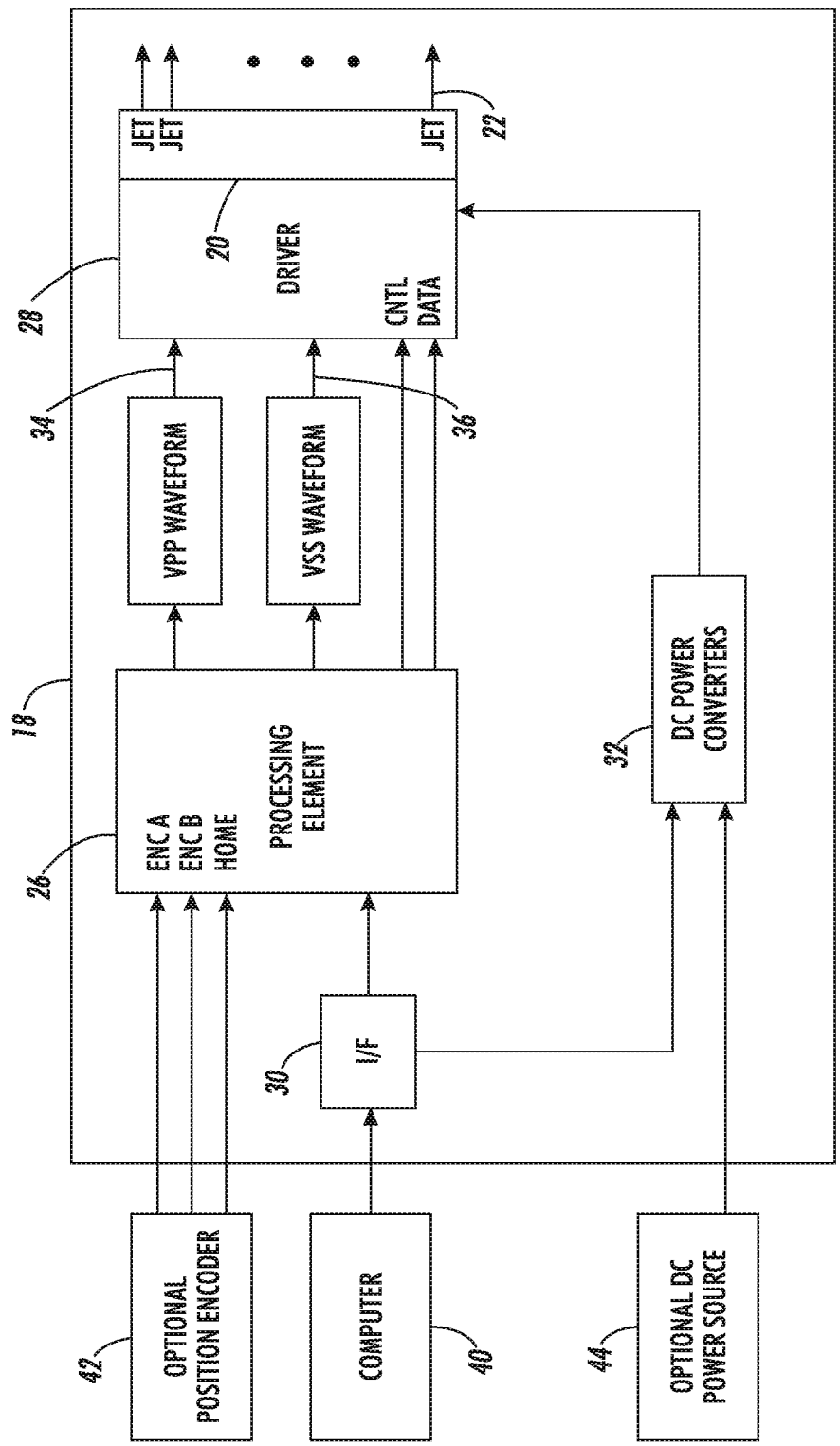
FIG. 3 shows an embodiment of a processing circuit for a standalone print head.

The print head may include an internally generated 'dot clock' or firing signal. The dot clock triggers a waveform set that causes the jets such as 22 to actuate and eject ink from the jet to the print substrate 24. The dot clock may be generated internally or external from the print head. The internal source may be phase-locked to an external encoder. FIG. 3 shows a print head architecture of an embodiment of a print head having internal processing electronics, also referred to here as a 'standalone' print head. One should note that the term 'standalone' does not preclude the use of external components, but is standalone because they are optional.

In FIG. 3, the computer 40 has a standardized computer interface 30 to the print head 18. Interface 30 may be implemented as a USB to ULPI physical-interface chip supporting USB 2.0 to computer 40 and ULPI to processing element 26. ULPI is a UTMI (Universal Transceiver Macrocell Interface), Low-Pin Interface. One should note that this is only one example of a standardized computer interface. Any computer interface that complies with a published standard.

The image data comes from the computer 40 in the form of 32-bit words, one word per jet in jet-number order, which is image-column order, over the standardized computer interface cable. The print head consumes the data as dot clocks are provided, externally or internally. The computer interface connects to the processing element 26. The processing element is any device that can buffer and process the image data to generate the waveforms necessary to cause the driver to fire the jets. In some embodiments, this may be a Field Programmable Gate Array (FPGA) or an Application Specific Integrated Circuit (ASIC), or other device capable of buffering data and generating jetting waveforms in response to a dot clock, meaning an integrated circuit that is manufactured and programmed to provide control of the print head.

Image data from computer 40 typically arrives in bursts, such as USB packets, that are not synchronized with the dot clocks. Processing element 26 stores the image data into an internal buffer, signaling the computer to pause image data transmission when the buffer is full, using a mechanism such as the USB not-acknowledge (NAK) token.

Following each dot clock, processing element 26 performs two simultaneous operations. One operation is reading image data from the internal buffer and sending it to driver 28 for use following the next dot clock. This image data is typically 1 bit per jet, but may be more than 1 bit for print heads capable of ejecting multiple drop sizes. Image data to driver 28 is also typically not in jet number (image column) order, but rather in an order dictated by physical layout of driver 28 and jet stack 20. Processing element 26 is thus reading data from its internal buffer in a different sequence that it was written, and selecting a specific subset of each 32-bit image word for each jet. After enough dot clocks have occurred to use all 32 bits of an image word, that word is removed from the buffer, freeing space to receive more image data from the computer.

The second simultaneous operation of processing element 26 is to generate the VPP and the VSS waveforms used by the driver 28 to fire the jets such as 22. Analog circuitry external to the processing element finishes implementation of VPP and VSS waveform rails 34 and 36. This may include analog pulse amplifiers such as found in U.S. Pat. No. 5,677,647. It may also include DC power converters 32 connected to an external DC power source 44 or to power coming over the USB interface from the computer. Along with generating VPP and VSS, processing element 26 sends control signals to driver 28 indicating when enabled jets should connect to VPP or to VSS or to neither. Jets are enabled or disabled based on the image data sent to the driver following the previous dot clock.

Similarly, the dot clock may be generated internally, either at a fixed frequency or in response to a position encoder 42 that provides encoder signals such as ENC A and B to the processing element. These signals can function to start and stop the dot clock and phase-lock the dot clock to track encoder position. Alternately, an encoder input may be used directly as the dot clock, referred to here as external dot clock. Whether the dot clock is internally or externally generated may depend on the printing application. For example, an internal rate generator at a fixed frequency may work well in situations in which the movement of the print substrate does not vary and is at a known velocity. If the velocity of the print substrate does vary, then an encoder may phase-lock the dot clock to track the position of the print substrate. This may include the use of a phase-locked loop (PLL) within the processing element 26 to provide a printing resolution at a scale factor of the encoder resolution. An example of a PLL dot clock generator can be found in U.S. Pat. No. 6,076,922, incorporated here in its entirety.

A position encoder generates an encoder pulse signal dependent on relative movement of the print head and print support member along said first axis. A digital phase locked loop circuit consists of a phase comparator for receiving the encoder pulse signal and a feedback signal and generating a phase difference signal having at least first and second states. The dot clock generator has an integrator that outputs a digital signal representative of the integral with respect to time of the phase difference signal. a pulse generator responsive to the digital signal for generating a pulse output signal having a period dependent on the integral, and an output circuit for receiving the pulse output signal of the pulse generator and providing a first output signal and a second output signal. The first output signal is the feedback signal and the second output signal is the dot clock signal, and wherein the output circuit includes a frequency dividing counter for dividing the frequency of the pulse output signal by a selected constant to generate the second output signal.

Also, as mentioned above, for higher frequency applications on a normal USB2 connection, the print head will have a connection to an external DC power such as that coming from the DC power source 44. When printing at higher resolutions, expressed in dots per inch, the dot clock causes the jets to fire faster within a given interval as the print substrate moves. Higher resolutions therefore require higher frequency operation.

One aspect of the on-board processing electronics is that the image data is buffered and consumed as dot clocks occur, without having to fire on the computer clock used to transfer image data. The processing element includes a flexible-depth buffer that allows the processing element to store varying amounts of data for the jets as the dot clocks are received.

In one embodiment, the print head has the jets and all the necessary jetting waveforms, including the VPP and VSS power rails, control and data signals internal to it. The internal processing may include a PLL and receive encoder signals from an encoder external to the print head. This allows a system designer to choose to include inputs from an encoder or not. This also applies to the provision of DC power external to the print head.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A print head, comprising:
   a standardized computer interface to allow the print head to connect directly to a standard computer;
   an array of jets to deposit ink on a substrate in accordance with image data from the standard computer;
   a processing element having a buffer, the buffer included in the processing element and under control of the processing element, the processing element programmed to:
   receive image data through the standardized computer interface as data words corresponding to each jet;
   store the words of image data received through the standardized computer interface in the buffer;
   read the image data from the buffer as a subset of each word of image data in a different sequence than the image data was written;
   transmitting the subset of the word of image data to the array of jets when triggered by a dot clock, the buffer having a flexible depth of storage to store varying amounts of image data, wherein the buffer receives image data according to a clock from the standard computer and outputs data according to the dot clock; and
   a driver to trigger individual ones of the array of jets in accordance with the subset of the word of image data, wherein the standardized computer interface, the array of jets, the processing element, the buffer and the driver all reside in the print head.

2. The print head of claim 1, further comprising a connection to an external direct current power supply to provide direct current power to the driver.

3. The print head of claim 1, further comprising at least one connection to a position encoder.

4. The print head of claim 1, wherein the dot clock is generated internally.

5. The print head of claim 1, wherein the dot clock is generated externally.

6. The print head of claim 3, wherein the dot clock is generated from the position encoder.

7. The print head of claim 1, wherein the standardized computer interface comprises a Universal Serial Bus (USB) interface.

8. The print head of claim 7, wherein the USB interface comprises ones of a USB2, USB Power Delivery, or USB Type C interface.

9. The print head of claim 1, wherein the processing element comprises a field-programmable gate array.

10. The print head of claim 1, wherein DC power is provided over the standard computer interface to the driver.

\* \* \* \* \*